Sept. 16, 1930.  H. W. TUTTLE  1,776,054
BEVERAGE DISPENSING APPARATUS
Filed Feb. 9, 1928  6 Sheets-Sheet 4

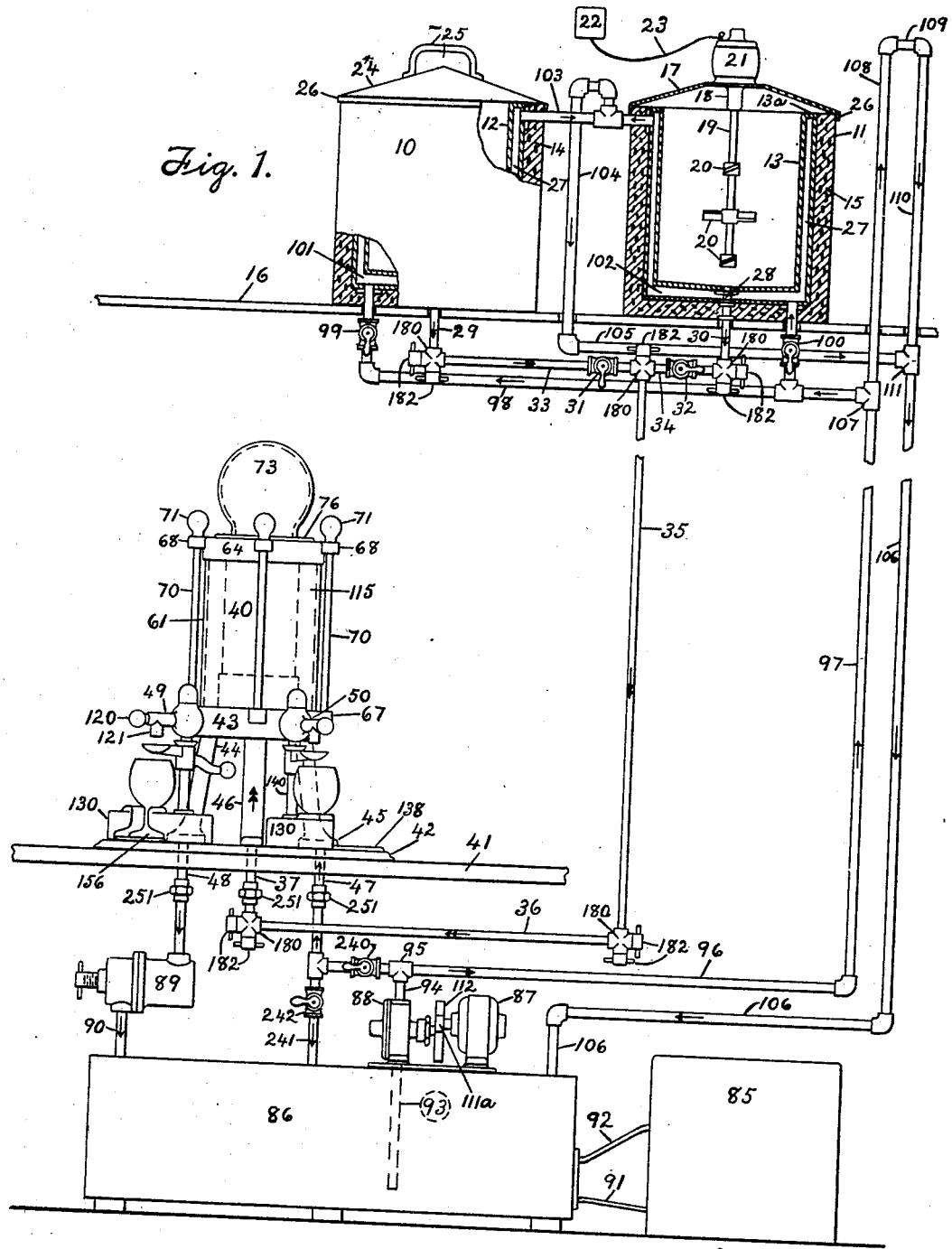

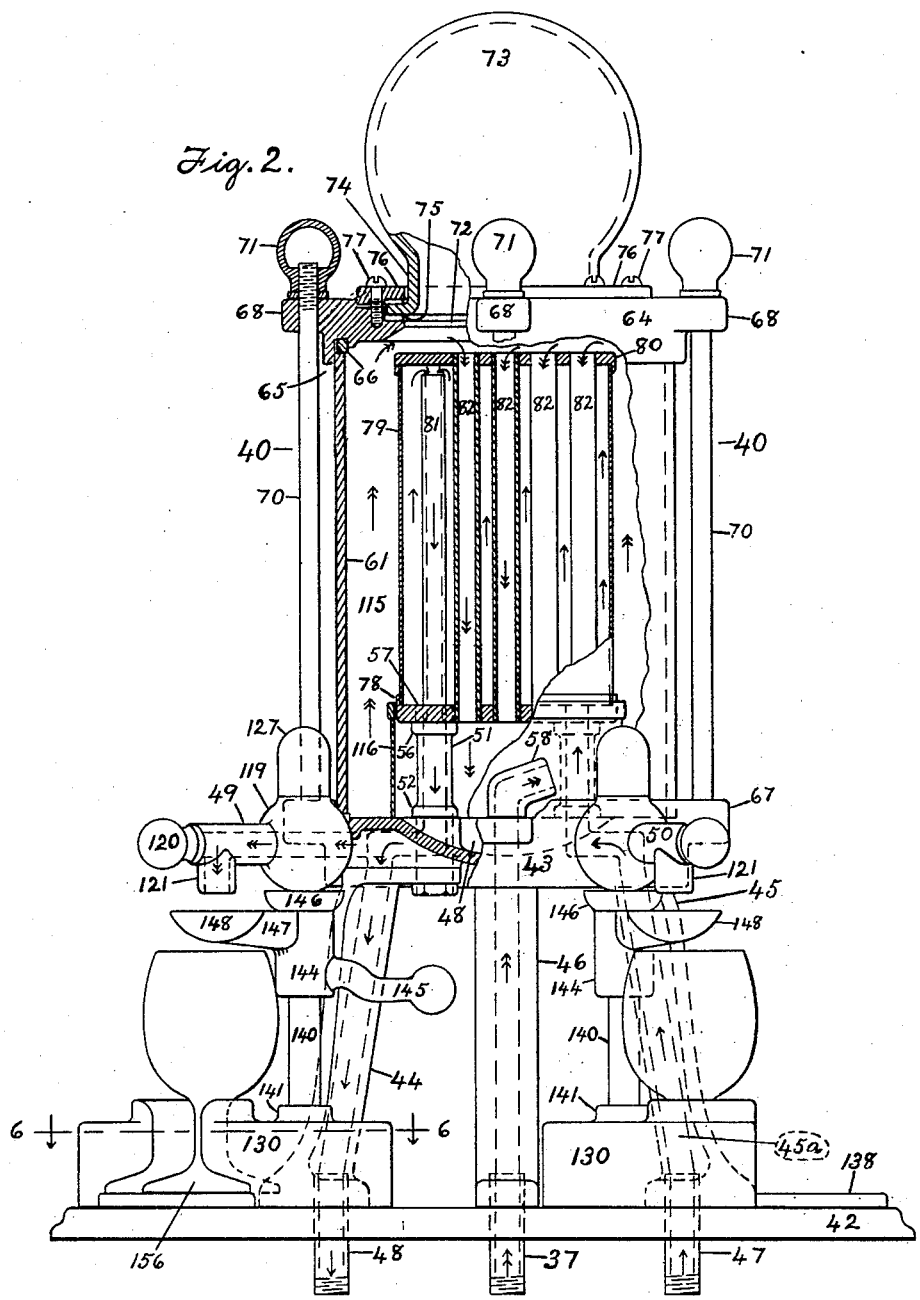

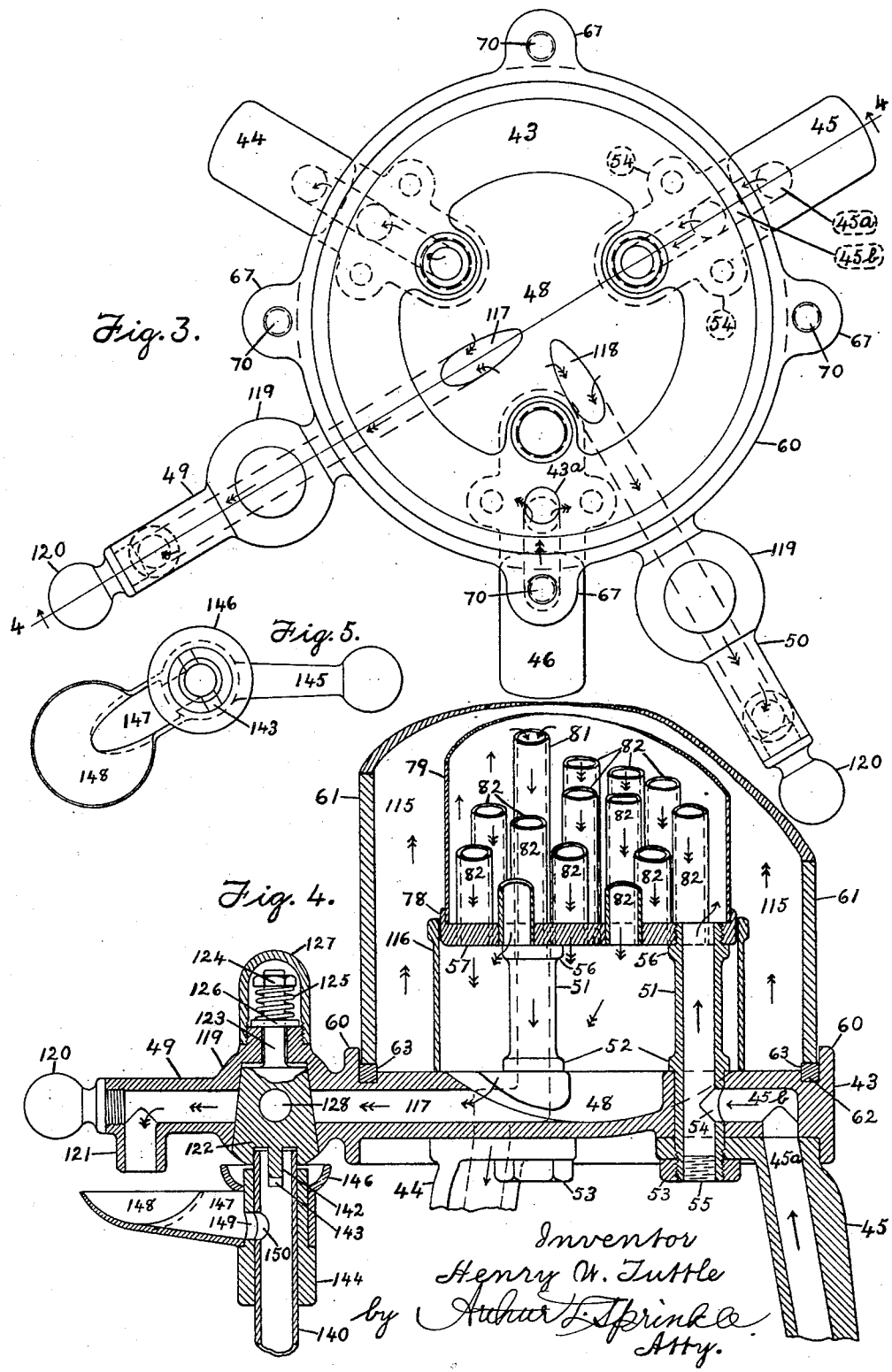

Inventor
Henry W. Tuttle
by Arthur L. Sprinkle
Atty.

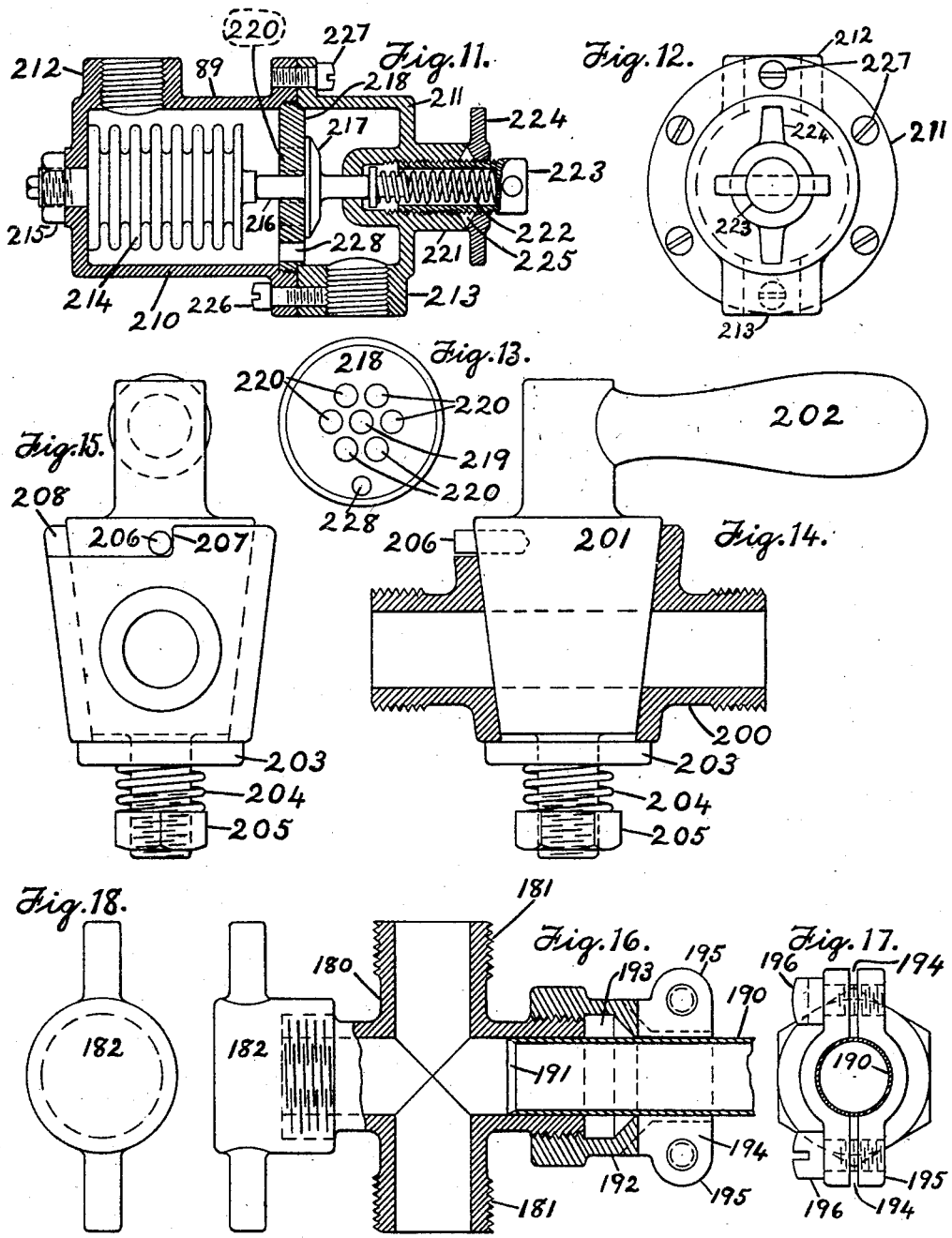

Patented Sept. 16, 1930

1,776,054

UNITED STATES PATENT OFFICE

HENRY W. TUTTLE, OF CHICAGO, ILLINOIS

BEVERAGE-DISPENSING APPARATUS

Application filed February 9, 1928. Serial No. 253,009.

The invention relates to novel and useful beverage dispensing apparatus.

The prime object of the invention is the provision of an improved construction of beverage containing or storing apparatus in combination with temperature controlling and dispensing apparatus connected therewith by means adapting liquid beverages to travel throughout the apparatus without contact with the air or other sources of contamination or inoculation with objectionable bacteria or other deleterious substances, particularly in dispensing beverages such as fruit juices, liquid milk products and the like of a more or less unstable character, thus providing a system for the described purpose which shall be capable of handling beverages under the most satisfactory conditions with respect to a high degree of sanitation.

One of the important objects of the invention is to provide in beverage dispensing apparatus novel and improved means for controlling the temperature of beverages being dispensed thereby, and particularly for providing a predetermined temperature control of the beverages at the time of leaving the dispensing apparatus.

It is a further object of the invention to provide an improved beverage dispensing device in combination with means for automatically indicating the amount or character or the amount and character of service rendered during a predetermined period by the apparatus, thus readily adapting the invention for use in the retail trade where beverages are being dispensed, and affording an automatic and reliable check upon the amount of service with respect to beverages withdrawn from the system.

A further object of the invention is to provide in combination with improved beverage dispensing means automatic cup or glass service indicating means, whereby a complete and accurate record of all service withdrawals of beverages from the system will be recorded, thus affording an accurate and reliable check upon sales and upon the honesty of the sales persons operating the apparatus.

A further object of the invention is the provision of improved beverage dispensing apparatus in which the visible or prominent portions thereof shall be of a design and construction rendering the same pleasing in appearance.

A further object of the invention is the provision in beverage dispensing apparatus of the described character of a system of separated containers connected by conduits, said conduits being provided with detachable connections adjacent all turns or angles therein, thus rendering the system readily accessible throughout for purposes of cleaning and hence sanitary.

It is a further object of the invention to provide in a beverage dispensing apparatus of the described character improved means for temporarily storing and agitating beverages prior to dispensing.

It is a further object of the invention to provide in a beverage dispensing apparatus of the described character improved means for agitating beverages while held in temporary storage together with improved temperature regulating and beverage draw-off devices.

It is a further object of the invention to provide in liquid dispensing apparatus an improved beverage container and temperature regulator for beverages contained therein in combination with visible draw-off automatically actuated recording mechanism for indicating the amount of service rendered by the device during a predetermined period.

A further object of the invention is to provide improved temporary holding and temperature regulating mechanism of a pleasing appearance wherein beverage and refrigerating conduits are concealed from the view of patrons or customers.

A further object of the invention is the provision in beverage dispensing apparatus of the described character comprising a reservoir, and a spaced apart temperature regulating and dispensing container or tank connected together in series by a conduit comprising metallic pipes or tubes in quick detachable connection with the said reservoir and dispensing tank whereby the said conduit and connections may be readily cleaned and sanitary conditions maintained, especially where beverages of a perishable or unstable character are used.

A further object of the invention is the provision in a beverage dispensing apparatus of a hand operated draw-off or serving cock normally closed and locked in closed position until automatically unlocked by the insertion into a position for receiving beverage from the draw-off cock of a tumbler or cup adapted to receive beverage drawn therefrom.

A further object of the invention is the provision with a beverage dispensing apparatus of a hand operated draw-off cock and means for normally locking the draw-off cock in closed position, said means being adapted to be actuated by the insertion of a tumbler or cup to receive beverage from the draw-off cock, whereby the said tumbler or cup acts as a key for unlocking the means controlling the draw-off cock.

A further object of the invention is the provision in a beverage dispensing apparatus of a hand operated draw-off cock and means connected therewith and operated by the draw-off cock whereby the opening of the cock locks the tumbler in receiving position, and whereby the closing of the draw-off cock registers the tumbler or cup as drawn from the dispensing device and releases the tumbler or cup to permit its withdrawal from the dispensing apparatus.

A further object of the invention is the provision in a dispensing apparatus of a tank for temporarily storing a quantity of beverage to be treated and dispensed including an agitator in the tank and automatic means for starting and stopping the agitator at predetermined intervals.

A further object of the invention is the provision in a beverage dispensing apparatus having a temporary beverage storage and treating tank, a dispensing urn provided with draw-off means for dispensing beverages therefrom, connections between said tank and dispensing urn for transmitting beverage, of temperature controlling means for beverages contained therein for supplying a temperature controlling fluid to the said tank and the said urn including a fluid circulating pump together with a safety device to prevent injury to the circulating pump due to a stoppage in the temperature control circulating system leading to the beverage storage tank.

A further object of the invention is the provision in a pipe system between a beverage storage and treating tank and a dispensing urn of a pipe system in which the valves and fittings for controlling the pipe system have circular holes throughout said valves and fittings of equal size of the outside diameter of the pipe and quick detachable connecting devices for sealing the pipe joints and for clamping the pipe and fittings together.

A further object of the invention is to provide in a beverage dispensing apparatus comprising a temporary holding and treating tank, a dispensing urn and pipe connections therebetween, of an improvement in the pipe system by which the pipe ends for sanitary reasons are not threaded, being inserted in smooth and sanitary orifices in the valves and fittings and sealed and clamped therein by quick detachable devices, the pipe ends being preferably reamed out to provide knife edge extremities for preventing the formation of pockets or obstructions in the system.

It is a further object of the invention to provide improvements in a beverage dispensing urn having draw-off means and fluid operated temperature control means, consisting of means permitting the quick detachability of the various parts thereof in contact with the beverage being dispensed to obtain accessibility and sanitary cleaning or cleansing of the apparatus.

It is a further object of the invention to provide in a beverage dispensing apparatus a temporary receiving and treating tank, a temperature controlling and dispensing urn and pipe connections between said tank and said urn in which every part thereof adapted to come in contact with beverage being dispensed is readily accessible for cleaning by the insertion of hand operated cleaning or cleansing devices other than fluid cleansing means.

A further object of the invention is the provision in a system of the described character of a dispensing urn provided with temperature controlling means consisting of a fluid circulating system contained substantially within the urn.

Other objects of the invention relate to various improved details of construction relating to portions of the mechanism hereinafter described with reference to the drawings which form a part of the specification. In the embodiment of the invention, as shown in the said drawings, and herein described, the invention is embodied in apparatus of a specific type primarily intended for the dispensing of beverages of the type of fruit juices like the orange juice of commerce, which is a widely sold beverage, having as one of its chief constituents the juice of oranges, either in a substantially pure form or with various modifying ingredients such as juices to modify the flavor slightly as lemon juice, sugar and water. It is obvious, however, that the apparatus of the precise character shown in the drawings is adapted to dispensing of a wide range of fluid beverages.

In the said drawings:

Fig. 1 is an elevation view of the apparatus comprising substantially my complete beverage dispensing system. In this view portions of the mixing and temporary storage receptacles are shown in partial section to disclose the details of construction thereof.

Fig. 2 is an enlarged elevation view of the draw-off and recording units of the dispensing apparatus with portions thereof broken away and other parts in section to disclose hidden details of construction thereof.

Fig. 3 is a top plan view showing the details of construction of the bottom plate of the beverage reservoir of the draw-off unit of Fig. 2. This view shows the reservoir of this unit disassembled by first removing the retaining devices and then leaving off the indicated parts from the receptacle of the base for purposes of cleaning.

Fig. 4 is a vertical sectional view with certain parts broken away and is taken approximately on the vertical plane, the position of which is indicated by line 4—4 on Fig. 3, looking in the direction indicated by the arrows.

Fig. 5 is an enlarged detail view of the combined draw-off cock operating device and drip catching and saving device.

Fig. 11 is a sectional view through the sylphon valve apparatus, the casing of which is shown in the system in Fig. 1, Fig. 12 being an end view from the valve pressure adjusting end of the same; and Fig. 13 a detail of the perforated division plate within the casing furnishing the seat for the valve.

Fig. 14 is a side elevation of one of the controlling cocks in the beverage line between the temporary receiving and treating tank and the dispensing urn, the valve casing being in section, and Fig. 15 is an end view of the same.

Fig. 16 is a detail of one of the sanitary pipe T connections with portions thereof broken away and other portions in section to illustrate the details of construction, and Figs. 17 and 18 are views looking at the respective ends of the device of Fig. 16.

Figure 7:
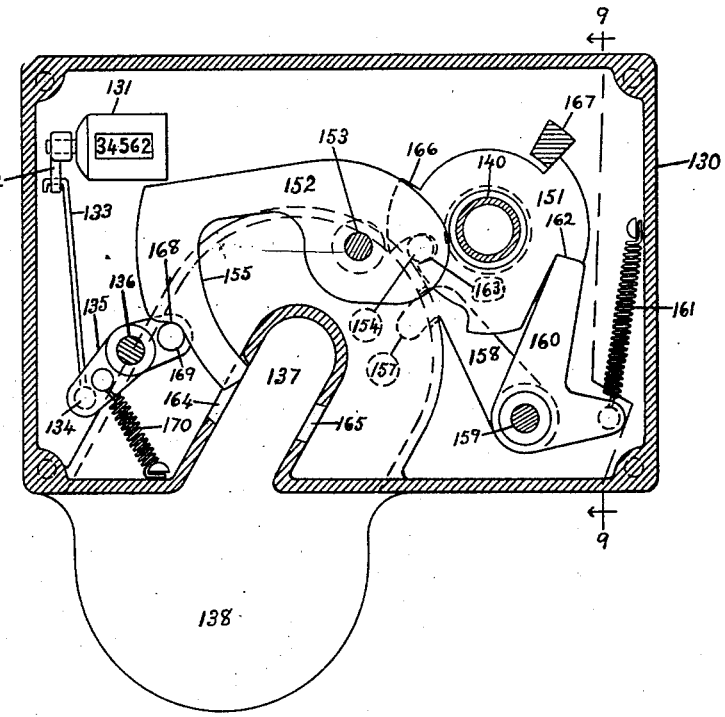
Fig. 7 is a complete sectional view taken on the line 6—6 of Fig. 2 looking in the direction indicated by the arrows.

The system comprising my improved beverage dispensing apparatus is shown in its preferred form in Fig. 1, in which the reference characters 10 and 11 designate the beverage containing and storing tanks of a like construction except for such slight modifications as are found necessary in suitably connecting them together with conduits for the circulation of temperature controlling fluid and for conducting the beverages therefrom to the dispensing unit of the system.

These consist of insulated beverage tanks 12 and 13, preferably of a metal capable of resisting any acid or other corrosive effect of beverage to be treated and dispensed, and they are preferably, although not necessarily, of cylindrical form and provided with closed bottoms except for the draw-off pipes and they are preferably housed or surrounded by cylindrical containers 14, 15 having the walls thickened, if desired, for insulating purposes, as illustrated. They may be conveniently formed of double or spaced apart metallic walls and bottoms with the insulating material interposed as shown in the drawings. Any suitable insulating material may be employed and any metal or other suitable material used in forming the walls, which shall be capable of resisting the effect of the heat controlling fluids to be employed in heat treating beverages. These containers 14, 15 with their interior beverage tanks may be supported in any desired manner as upon a floor or platform indicated at 16, it being desirable that they shall be positioned above the beverage dispensing unit so that the beverage may be delivered by gravity to the latter.

When the system is employed for dispensing beverages containing as their chief component fruit juices, as orange juice and the like, agitation of the beverage within the tanks 12 and 13 at spaced intervals is desirable and necessary to secure uniformity in the product delivered by the dispensing unit. A convenient means of accomplishing this result is obtained by providing a removable cover 17 which has a peripheral portion adapted to fit over the top of the outer tanks 14 and 15 and being adapted also to cover the open top of the beverage tanks 12 and 13 on the interior. The removable cover 17 will be preferably provided with a central bearing portion 18 adapted to have journalled therein a shaft 19 carrying a plurality of spaced apart paddles or stirrers as designated by reference character 20. The latter may be of any desired construction to suitably agitate beverages within the tanks 12 and 13 when a rotary movement is imparted thereto through the shaft 19 by means of an electric motor 21, the shaft of which will be directly connected with the shaft 19, preferably to form a continuation thereof. Instead of the motor 21, obviously, any suitable mechanical device may be employed for operating the stirrer shaft and the stirring elements 20 thereon, but I prefer the use of the electric motor, particularly where fruit juice beverages are to be dispensed by the apparatus, and in order to secure a uniform mixture and satisfactory operation of the stirring mechanism, I prefer to use a clock operated electric switching mechanism which may be purchased upon the open market and is shown diagrammatically only in Fig. 1, being designated by the reference character 22, 23 being a cable connecting the clock operated switch control in the power supply line with the motor 21. Clock operated electric switches are available upon the open market that may be thus positioned in the power line 23, capable of automatically operating and stopping the motor 21 at such intervals as may be desired by the operator of the system. Obviously, the power line 23 will be flexible and the motor and stirring device being mounted solely upon the cover 17, the latter may be shifted at will from one to the other of the two tanks 12 and 13, as desired in treating and dispensing beverages therefrom. The reference character 24 designates a removable cover provided with a handle 25 that will be conveniently employed in covering the tank that is not shielded by the agitating device on the removable cover 17. The reference character 26 designates a peripheral depending flange that may be formed on the covers 17 and 24 to position the covers on the tanks. The space between the beverage tank and the insulating tank, which may be filled with temperature regulating fluid is closed at the top by peripheral plate 13ª. The apparatus comprising the two units 10 and 11 may thus be conveniently employed for the storage of prepared beverage materials which may be admitted to these containers by pouring the same thereinto from portable vessels, if desired, after first removing the covers and then, as in the case of preparing orange and other fruit juice beverages when it may be desired to add water and other flavoring materials, these latter may also be poured from portable vessels into the tanks 12 and 13 and the material suitably agitated by means of the motor driven agitator, as described, to prepare the same for dispensing, while the automatic operation of the agitator by means of the clock switch, referred to, may be conveniently utilized for keeping the beverage in a state of uniform consistency during dispensing periods.

In order to insure that the temperature control of beverage materials within the tanks 12 and 13 may be adequate, a suitable space, as designated by the reference character 27, will be provided between the outer peripheral walls including the bottom of the same, and the corresponding inner wall surface and bottom of the insulating outer covering or tanks 14 and 15. The beverage tanks 12 and 13 may be supported in this spaced apart relation by means of central base members 28 which will preferably be perforated to correspond with co-operating perforations in the bottoms of the beverage tanks and will have suitable pipe connections with the vertical beverage draw-off pipes 29 and 30, which communicate with the pipe system leading to the beverage dispensing or draw-off unit of the system, which will now be described.

The draw-off or dispensing unit of my beverage dispensing system requires special treatment in its design for purposes of utility as well as appearance. The matter of ornamentation or appearance in a dispensing device is of prime importance by reason of the fact that such apparatus is commonly and almost of necessity positioned in plain view of patrons using the beverages to be dispensed thereby. The reference character 40 designates generally this unit of my dispensing system. I prefer to construct it so that it may be positioned upon a table or counter, as indicated at 41, for convenience in installing, which dispensing or draw-off unit may be detachably mounted or carried upon a plate 42 capable of being placed upon the counter or table 41, as illustrated in Fig. 1. The use of the plate 42 is also desirable in connection with this unit, enabling the correct positioning of my automatic cup or glass service indicating means at the factory prior to the installation of the system in its place of use.

Shown in its assembled relation with the beverage preparing, storage and temperature treating portions of my system in Fig. 1, the details of my dispensing unit 40 are shown most clearly in connection with Figs. 2 to 10 inclusive. Beverages being dispensed from the unit 40 of my system will preferably, although not necessarily, be conducted thereto at substantially the temperature at which it is desired to serve the same. The construction of the draw-off unit 40, however, is such that temperature control is attained while the beverage is within this unit of the system, this temperature control being of a character that will permit modification of the temperature of the beverage after it enters the draw-off unit 40 or the temperature control apparatus may be used merely to maintain the beverage in a uniform temperature condition while therein during any desired operating period. Obviously, the inclusion of temperature controlling means in the draw-off unit 40 results in the inclusion of many improved details of construction in devices of this character to insure that the patrons will at all times be supplied with beverage at an absolute uniform and predetermined temperature so necessary to the successful service of beverages.

While the unit 40 will usually of necessity be, as stated, in full view of the customer on the counter, shelf or table 41, the construction of my system, as shown, permits of the complete shielding or hiding of the mixing and storage tanks 10 and 11, from which beverage passing by gravity through the adjacent vertical discharge pipes 29, 30 may be allowed at the will of the operator, under the control of the hand operated valves 31, 32, to pass through the horizontal pipes 33, 34 and through the common T connection 180 into the vertical pipe 35 and thence through the horizontal pipe 36 to the vertical pipe 37 which leads and discharges directly into the beverage containing compartment or draw-off unit 40.

In considering the embodiment of my invention as illustrated in the drawings, it is of assistance to note that I have used the double headed arrows throughout the said drawings to indicate compartments and passages through which the beverage passes or is contained while the single headed arrows throughout the system indicate compartments and passageways only accessible to temperature controlling fluid.

In the construction and arrangement of the elements entering into my beverage draw-off unit or dispensing urn, and to permit of the quick detachability of all the various parts thereof in contact with the beverage being dispensed, to obtain easy accessibility for sanitary cleaning or cleansing of the apparatus, I prefer to construct the beverage dispensing urn portion of the unit so that the urn or compartment itself may be easily and quickly detached from its base or support, thus opening the interior of the beverage compartment so that the temperature control apparatus therein, as well as all parts of the apparatus coming in contact with the beverage, may be easily accessible for cleaning. To this end, the base of the urn proper, designated by reference character 43, is formed, preferably, of a separate casting of suitable acid resisting metal and is supported upon the base plate 42 by a plurality of legs. This casting is shown in the top plan view in Fig. 3 and in section in Fig. 4. The supporting legs 44, 45 and 46 are of special construction for the purpose of providing inlet and outlet passages for the circulating temperature control fluid and a passageway for the introduction into the dispensing urn of the beverage to be dispensed therefrom. To that end each of the legs 44, 45 and 46 are provided with enlarged radially extending foot portions, as clearly shown by the drawings, adapted to rest upon the base plate 42, and each of the legs have longitudinal openings extending throughout their lengths, these openings extending also into the foot pieces, and in the foot pieces the openings being somewhat enlarged to receive the upper extremities of not only the beverage supply pipe 37 which is connected with the opening in the lower end of the leg 46, but the corresponding openings in the legs 44 and 45 are connected with the respective inlet and outlet pipes 47 and 48 of the temperature regulating or refrigerating system to be presently described. At their upper extremities each of the supporting legs 44, 45 and 46 are expanded to furnish suitable supporting and bracing contact with the base plate 43 of the dispensing urn. The plate 43 is provided on the top side thereof with a depression, as indicated at 48, in the form of a segment of a sphere, which is in the nature of a sump and leading from the bottom of the same I provide one or more radially extending conduits cast in the body of the plate and terminating in the radially and horizontally extending draw-off cock or faucet ports 49 and 50.

There may obviously be any number of such draw-off cocks, two being shown in the present embodiment of the invention. The upper extremities of the supporting portions of the legs 44, 45 and 46 may be extended radially inwardly toward the center of the bottom of the plate 43 and for convenience in securing the legs and to insure accessibility to the temperature regulating fluid or brine inlet and outlet pipes and the beverage inlet pipe, I prefer to connect these conduits leading to the supporting legs of the dispensing urn in the manner shown most clearly in Figs. 3 and 4. For example, it will be seen that the conduit forming a continuation of the opening in the brine inlet pipe 47 extending through the leg 45 and designated in Fig. 4 by the reference character 45$^a$, coincides with an opening 45$^b$ extending vertically a short distance and thence horizontally and being tapped into the vertical brine inlet pipe 51, which latter is provided intermediate its ends with a peripheral shoulder 52 and having its lower end passing through an orifice in the plate 43 and a corresponding orifice in the upper and inwardly projecting support at the upper end of the leg 45, and being threaded on its extreme lower end to receive a threaded clamping nut 53. The legs may be further strengthened in their connection with the plate by passing suitable machine screws through perforations in spaced ears 54 formed at the top extremities of these legs. The inlet pipe 51, for the refrigerating fluid which enters through the passageway 45$^b$ formed in the leg 45, is shown in section in Fig. 4, and passes thence through the passageway cast in the plate 43 enters the inlet pipe 51 for the refrigerating fluid through the orifice 54 in the pipe and when in use for circulating the temperature regulating fluid the lower end of the pipe 51 may be closed by a removable plug inserted in the screw threaded portion designated by reference character 55.

The discharge pipe for the temperature regulating fluid which conducts the fluid in the downward direction, as indicated by the arrows, is constructed precisely like the pipe 51 heretofore referred to as connected with the inlet for the temperature regulating fluid in the leg 45 and it is designated by the same reference character, being provided with the peripheral shoulder 52 for supporting the same in connection with the plate 43 and the corresponding supporting leg 44 which is provided with like discharge passageways through the leg 44 in communication with the discharge pipe 48 for the cooling fluid. The construction of the leg 44 is in other respects precisely the same as that of the leg 45 and through the opening therein the cooling fluid is returned to the circulating system. The lower end of the pipe 51 co-operating with the leg 44 is also provided with the same means for temporarily closing the lower end of the pipe for sanitary cleaning purposes, and also with the locking nut 53 for engaging the upper end of the leg 44. Both of the pipes 51 are provided near their upper extremities with peripheral collars 56 and beyond these collars to the upper extremities they are exteriorly threaded and have threaded engagement with a circular plate 57 which serves as the bottom of a compartment formed on the interior of the cooling urn to be presently described.

The leg 46, before described, which has a communicating passageway on the interior thereof for admitting the beverage into the dispensing urn is constructed in the same manner as the corresponding legs 44 and 45 so that beverage passing from the pipe 37 enters through an orifice in the outer periphery of the plate 43 corresponding to the vertical portion of the orifice 45ª shown in Fig. 4. This opening, however, extends vertically through the plate 43 as indicated at 43ª, Fig. 3, and terminates on the inside of the urn near the outer periphery thereof in a nozzle designated by reference character 58 (Fig. 2). This nozzle is provided with a discharge orifice through which beverage to be dispensed is admitted into the dispensing urn to be temporarily stored and to have its temperature regulated prior to being drawn therefrom through the dispensing cocks. The main body portion of the upper surface of the plate 43 is preferably circular in form and is provided on its outer periphery with an upstanding flange 60. The flange 60 is designed to serve as a bottom retaining wall to prevent lateral movement of the dispensing urn cylinder designated by reference character 61, which may be of any suitable material, but is preferably of glass when intended to be used in surrounding relatively cool fruit juices as beverages in order that the beverage to be dispensed may be visible on the interior thereof. Being of cylindrical form glass may be conveniently used and in order to provide a liquid tight joint at the bottom on the inside of the peripheral upstanding flange 60 the material in the bottom plate 43 may be grooved, as designated at 62 and a gasket or ring of rubber or other suitable material, as indicated at 63 inserted. 64 is a metal top piece which may also be circular in general form and having around its lower periphery a peripheral depending flange 65 and an interior groove with a leak-proof gasket 66 corresponding to the similar parts at the bottom. The bottom plate 43 will preferably be provided with three or more radially extending projections 67 adapted to coincide with a plurality of radial similar projections 68 in the top plate 64. These projections in the top plate will likewise be perforated and when the glass cylinder 61 and the top and bottom plates as described are in assembled relation, they may be clamped and held together in such detachable relation to insure a liquid-tight closure by means of a plurality of threaded rods 70 of which four are shown spaced around the periphery of the cylinder. The lower ends of rods 70 are preferably screw threaded into threaded openings or perforations in the ears 67 and their upper ends passed through unthreaded perforations in the registering ears 68 in the top plate 64 with the upper ends of these rods extending beyond the upper surface of the plate where they are threaded and adapted to be engaged by threaded members 71, which may be in the form of nuts, but preferably will take an ornamental form, as illustrated in the drawings, Figs. 1 and 2, having an enlarged hollow upper portion above the threaded part adapted to serve as a convenient means for grasping by the hand in assembling and disassembling.

It is one of the important features of my invention with respect to the dispensing urn to construct it so that it shall have a pleasing and ornamental appearance, and to utilize transparent media in the walls thereof at least partially to disclose the character of the liquids being dispensed by rendering the same visible. In carrying out this feature in the construction of the urn, I preferably provide the top plate 64 with a central opening designated generally by the reference character 72 and I close the same with a closure member 73, substantially of spherical form, the same being hollow on the interior and having an enlarged downwardly opening passageway surrounded by a wall 74 and terminating in a lower peripheral flange 75 adapted to rest in a counter-sunk peripheral groove or ledge around the outer periphery of the opening 72. A liquid-tight joint may be provided by careful machining and grinding of these contacting surfaces, but preferably, to avoid expense of machine work, I employ suitable rings or gaskets of fiber, rubber or other analogous material to secure a liquid-tight connection between the spherical top and the plate 64.

Clamping ring 76 and suitable screws 77 may be used for clamping these parts in liquid-tight relation as illustrated in Fig. 2.

If it is not desired to use transparent material as glass in the construction of the spherical and cylindrical portions 73 and 61, respectively, of the dispensing urn, nickel or silver plated metal may be used to advantage. Located within the cylinder 61 of my improved dispensing urn and supported above the top side of the bottom plate 43 is the circulatory system intended to admit temperature regulating fluid to the interior of the dispensing urn for the purpose of modifying or controlling the temperature of liquids being dispensed therefrom and temporarily stored therein for dispensing, as heretofore briefly and partially described, the temperature regulated fluid being admitted through the inlet pipe 51 into a closed compartment formed by the aforesaid circular plate 57, which has an upstanding peripheral flange 78 adapted to receive a cylindrical member 79, the walls of which are imperforate, but which have an upper end closed by a header plate 80. Liquids to be dispensed being admitted to the interior of the dispensing urn through the pipe lines 37 and the passageway through the leg 46 are discharged by the angular nozzle 58 at the bottom of the dispensing urn on the interior thereof in such a manner as to have a circumferential motion around the interior of the urn, thus tending to stir or agitate the liquid being dispensed, which is advantageous, particularly where liquids like fruit juices are being passed through the apparatus. The temperature regulating fluid, as for example, the fluid from the refrigerating unit, will enter the dispensing urn through the duct 45$^a$ in leg 45 and thence through the lateral duct 45$^b$ and the orifice 54 and upwardly through the interior of the short pipe 51 to the interior of the cylinder 79.

The cylinder 79 may be of metal, glass or other suitable liquid retaining material and the effect of circulation of the temperature regulating fluid will be to distribute the same throughout the interior of the chamber 79 and hence impart the temperature thereof to the liquid surrounding the chamber 79, which latter is the liquid to be dispensed. The temperature regulating fluid being admitted through the bottom plate 57 is afforded opportunity for thorough intermixing while in the cylinder 79 by reason of the fact that the discharge orifice is located near the top of the cylinder and consists of an upstanding pipe 81 which is a continuation of the return pipe 51 for the temperature controlling fluid heretofore referred to. The pipe 81 is open at its upper extremity, the open end thereof being located a short distance, as shown in Fig. 2, below the underside of the top header plate 80.

I find that the efficiency of the temperature controlling apparatus may be greatly increased by perforating the top and bottom plates 80 and 57, respectively, and inserting therein a plurality of tubular pipes 82 similar to the flues of a boiler used in steam generation or water heating. Such pipes or tubes being open on their interiors at both ends, afford means for the downward passage therethrough in the direction indicated by the double-headed arrows of the liquid being dispensed from the apparatus. The cooling efficiency of the apparatus will depend somewhat upon the number of such vertical passages and will depend somewhat upon the size of the apparatus employed, and the character of the liquid being dispensed, as well as upon the character of the temperature controlling fluid employed in the system. With so much of a description of the apparatus as has been given, I will now refer to its preferred mode of operation interspersing further descriptive matter with respect to certain parts not already detailed.

Assuming that the apparatus as shown in assembled relation, for example, in Fig. 1 and detailed in the accompanying drawings, is installed, as shown for dispensing fruit juices, the operator will cause a proper and desired mixture of fruit juices to be prepared within the interior of one of the tanks 12, 13. As for example, the tank 13, to which the motor driven stirrer is shown applied with the liquid to be dispensed in this tank 13, when the automatic control 22 for the motor 21 is in condition for predetermined intermittent operation, the motor will, at predetermined intervals operate the stirrer shaft 19 and the blades 20 thereon to thoroughly mix the liquid to be dispensed. At the same time the operator will admit, through the pipe 30 past the valve 32 and through pipes 35, 36 and 37, a sufficient amount of fluid to fill the dispensing urn, such fluid or fruit juice passing, as before described, through the passageway in the leg 46 of the urn with a centrifugal or whirling motion into the bottom of the dispensing liquid compartment in the urn. Entrapped air may be exhausted from the dispensing urn in the initial filling operation as by opening one or more of the indicated faucets on the urn to permit entrapped air to escape until the urn is seen to be filled with the fluid to be dispensed. When fruit juices, as for example, the juice of oranges or a mixture of fruit juices and various flavoring materials with other liquids such as water and the like are being dispensed, it is usually desired to serve or dispense such fluids in a comparatively cool or chilled condition. In order that the temperature controlling fluid to be admitted through the temperature controlling or refrigerating system shall be of the desired temperature, I may, with my apparatus, employ any of the common and well known refrigerating units and these being at the time of my invention old and well known, I make no claim to any specific form of such refrigerating apparatus, but refer generally to the preferred arrangement of the same in connection with my system, in which the reference character 85 designates a compressor unit and 86 an expansion tank. 87 is an electric motor and 88 is a pump shown generally as of rotary type for circulating the refrigerating material through the system along the lines indicated by the single headed arrows. The reference character 89 designates an expansion or control valve, preferably the common sylphon type, the details of which are shown in Figs. 11 and 12. This valve being controlled by the temperature of the refrigerating or temperature controlling fluid passing therethrough and through the refrigerating system may be set to maintain the temperature controlling fluid at any desired degree. The details of its construction will be presently referred to and the casing thereof is connected with a return line of the cooling fluid from the dispensing urn heretofore referred to and designated generally by the reference character 48. Leading from this valve control casing 89 to the interior of expansion tank 86 is a pipe 90.

In arranging my improved system for dispensing refrigerated fruit juice beverages and the like, I prefer to connect the refrigerating apparatus in such a manner that I may control the temperature of the beverage liquids within the storage tanks 12 and 13 as well as within the dispensing urn 40, and this arrangement or inter-relation of the various elements mentioned is accomplished by pipe connections as follows:

The compressor unit 85 is connected with the expansion tank 86 by means of the discharge and return pipe lines 91 and 92, respectively, which connect these units. The motor operated rotary pump 88 is provided with an intake pipe 93 to take the refrigerated cooling fluid from the expansion or cooling tank and discharging through the short line 94, through the T 95 and pipes 96 and 97, and conducts the refrigerating fluid toward the temperature controlled storage and mixing tanks 12 and 13, this being accomplished by a horizontal pipe 98 connected with the upper end of the pipe 97 by T connection. The pipe 98 has vertical extensions controlled by the hand valves 99 and 100, which convey the refrigerating or temperature controlling fluid into the compartments between the storage and mixing tanks 12 and 13 and their insulated containers. These compartments for the circulation of the temperature regulating fluid are indicated in the respective tank structures by the reference characters 101, 102, respectively. These compartments for the temperature regulating fluid extend beneath the bottoms of the tanks 12 and 13 and also peripherally around the tanks to the top thereof, as indicated in the drawings. To insure complete and thorough circulation, the compartments 101, 102 near the tops thereof are connected by the horizontal pipe 103 into which the overflow is discharged from both compartments and thence through the downward return pipe 104 tapped thereinto and having a horizontal connection 105 communicating with a return line 106, which leads back to the expansion tank 86.

In order to provide a safety means to prevent injury to the circulating pump 88 in the event the cocks to the beverage storage tank may be closed when the pump is operated, I provide a T connection 107 at the union between the horizontal and vertical lines 97, 98, with a vertical extension 108 which leads to a point somewhat above the upper extremities of the tanks 12 and 13 so that there will be provided a sufficient head of liquid at all times to insure that the compartments around the beverage storage tanks 12 and 13 will be filled with temperature regulating fluid whenever the cocks 99 and 100 are open. At the same time there is a U-connection 109 at the top of the pipe 108 leading into the downwardly extending return pipe 110, which is tapped by a suitable T into the union 111 connecting the horizontal return pipe for the temperature regulating fluid with the vertical return pipe 106 leading back to the expansion tank 86.

By this construction if both the cocks 99 and 100 shall be closed and the pump controlling the temperature regulating fluid be started, circulation through the by-pass or pipe over the top 109 of the system will be permitted and no harm done to the circulating pump or other pumping apparatus. As is well known in this class of temperature regulating devices, the sylphon valve may be regulated so as to control the return passage of the fluid from the dispensing urn and hence regulate the temperature of beverages contained within the urn. The motor 87 is operatively connected with the pump 88 in any desired manner, but I show diagrammatically a speed reducing connection consisting of a pinion 111$^a$ on the shaft of the motor meshing with a driving gear 112 on the rotary shaft of the pump 88.

Assuming that the operator has one or both of the storage tanks 12 and 13 charged with fluid fruit juices or other desired beverages to be dispensed, the same being susceptible to periodic stirring actions by the electrically operated stirrer described, and assuming that the beverage dispensing urn has been filled by allowing the beverage to flow thereinto, which, in the case of the beverage within the storage tank 13 would be accomplished by opening the valve 32 to the position shown in the drawing, Fig. 1, the operator, with the valve 32 open, would then be in position to begin dispensing beverages from the dispensing urn.

If the dispensing device shall have the beverage containing compartments thereof made of glass or other transparent material, beverage such as orange juice will be plainly visible therein, and with the refrigerating apparatus briefly described, the temperature of the beverage within the mixing tanks as well as within the beverage dispensing urn may be maintained at a desired and uniform temperature. Obviously, the withdrawal cocks 49 and 50, which are shown as hand controlled, might be of any desired construction to permit the withdrawal from the interior of the dispensing urn of the cool beverage contained therein. However, these dispensing systems are usually in the care of or under the immediate control of sales persons, and in order that there may be an automatic check upon the withdrawals or sales of beverages, it is an important feature of my invention that I have provided in connection with the draw-off devices on my dispensing urn means whereby the operator will automatically record a record of beverage withdrawals or servings, which is usually done by means of cups or tumblers of glass or analogous material. Such mechanism and further important details of my beverage dispensing urn will now be described.

Reference has heretofore been made to the agitation or swirling motion produced in the beverage upon its being discharged into the compartment within the dispensing urn comprising the space between the cylindrical wall of the temperature controlling devices and the outer wall 61 of the urn, which space is designated generally by the reference character 115. This action is further accelerated and intermingling of incoming portions of the beverage with portions that have been submitted to the temperature regulating media prevented by means of a cylindrical band or closure member 116 which is detachably placed within the dispensing urn, being in the form of a cylinder open at both ends and of a size adapted to telescope or fit closely around the cylindrical plate 57. Therefore, when this band 116 is in the position indicated in Fig. 4, incoming beverage must pass vertically upward through the compartment 115 to the top of the urn and thence downwardly through the tubes or flues 82 where it will be cooled in its passage and discharged into the compartment below the plate 57 in a modified condition with respect to temperature without mingling with the incoming and untreated currents of beverage. The bottom plate 43 of the dispensing urn is provided with radially extending ducts 117, 118 which communicate with the sump or depressed portion 48 in the bottom of the urn. The material around said ducts 117, 118 being radially extended on the outside of the urn in the manner illustrated in Figs. 1, 2, 3 and 4 forming the aforesaid spigots or draw-off faucets 49 and 50. The faucets or draw-off cocks 49 and 50 are identical in construction, the tubular portion thereof being expanded or thickened into a spherical like form as designated at 119. For sanitary purposes in cleansing the draw-off cock, as in all of the other pipe sections of my system to be hereinafter more specifically referred to, I prefer to close the outer extremity of the body of the faucet by a threaded hand operated plug designated by the reference character 120, which is screw threaded into the end of the pipe. Near the outer extremity is provided a downwardly extending nipple or spout 121 for discharging beverage therefrom, and the passageway 117 is controlled by a rotary valve member in the form of a frustum of a cone designated at 122 having a vertical stem 123 passing through an opening on the upper side of the spherical portion of the casing and being threaded at its upper extremity and provided with a nut 124 for retaining a spring 125 therebetween and between a washer 126 which is inserted between the spring and the casing to protect the end of the spring against friction or abrasion during the operation of the faucet. The projecting upper end of the valve is covered by an internally threaded cap co-operating with a threaded portion of the casing indicated at 127. The valve being of frusto-conical form under the action of the spring 125 will maintain its seat and is provided with a lateral opening 128 to register with the duct 117 to open the faucet. The means for operating the faucet valve 122 and controlling the withdrawal of beverage from the urn through the discharge nozzle or spout 121 is one of the important features of my invention, this being connected with my automatic recording device, which will now be described with reference to the structure shown in Figs. 1, 2, 3, 4 and 5 and shown in greater detail in Figs. 6 to 10 inclusive.

Figure 6:
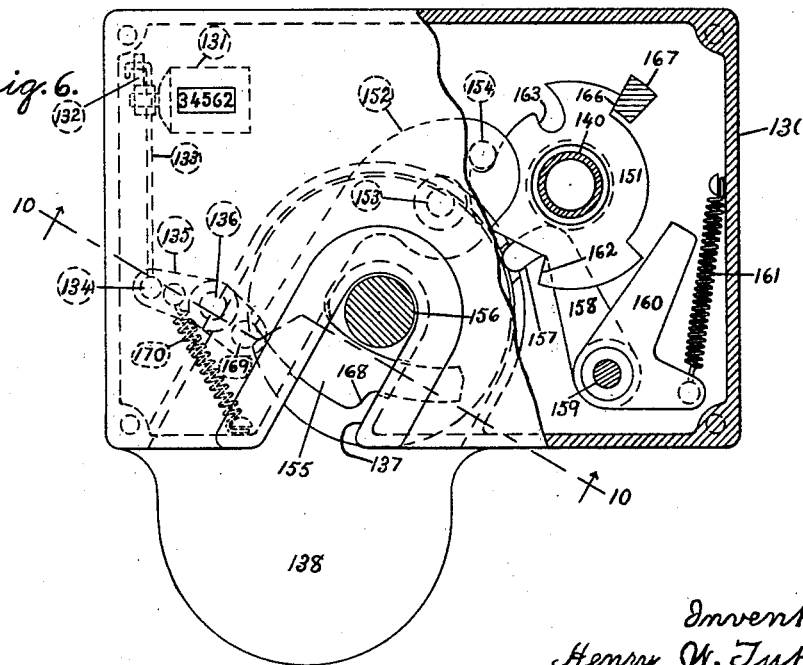
Fig. 6 is a top plan view of the cup or tumbler holder and register with parts broken away and in section, the partial section being taken approximately on line 6—6 of Fig. 2, looking in the direction indicated by the arrows.
Figure 8:
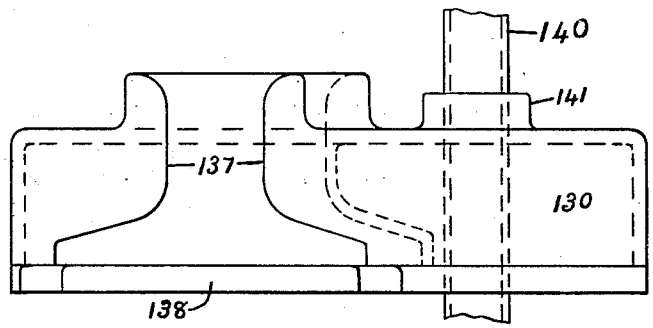
Fig. 8 is a front elevation view of the device shown in Fig. 6.
Figure 9:
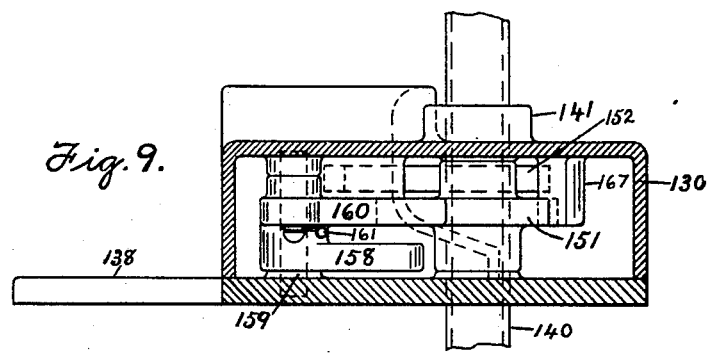
Fig. 9 is a section on broken line 9—9 of Fig. 7, looking in the direction indicated by the arrows.
Figure 10:
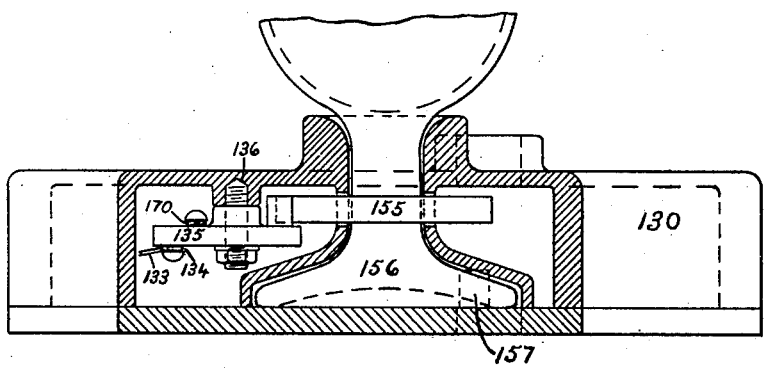
Fig. 10 is a sectional view taken on broken line 10—10 of Fig. 6 looking in the direction indicated by the arrows.

Obviously, in connection with the dispensing device of the described character the number of draw-off cocks or spigots may be varied within certain limits to accommodate one or more operators in making use of the same urn, two such units being shown in the drawings in my present embodiment of the invention, and since the mechanism associated with each of the draw-off cocks 49 and 50 is identical with respect to the automatic interlocking and recording features, it will be understood that in describing such mechanism as connected with the draw-off cock 49, it will apply equally to the mechanism associated with the companion draw-off cock 50 and in each case the same reference characters will be employed. In the dispensing urn employed in my preferred system as shown in the drawings, the glass tumbler or goblet of the variety having the stem and pedestal or base is shown, although it will be apparent that the form of the cup or glass employed for dispensing beverage may be modified within certain limits without departing from the character and scope of the invention. On the base 42 to which the supporting legs of my urn are attached, I attach in a suitable and permanent manner, as by suitable retaining bolts or rivets, an interlocking mechanism in the form of a slotted casing designated generally by the reference character 130 and containing recording mechanism. In Fig. 6 I show the stem of a tumbler or glass in section with the base of the tumbler in position within the retaining and supporting slot of the recording device, it being my object to provide automatic mechanism which will insure that the sales person shall in the act of drawing off beverages and dispensing same to customers automatically make a record of each sale. Within the casing 130 is mounted a recording instrument of the usual gear operated disc type adapted to record successive actuations of a shaft in the usual or any desired manner, the casing of such instrument being designated generally by reference character 131, the ratchet mechanism for operating the recorder by the reference character 132, while 133 is a link pivotally connected with the ratchet arm of the indicator and having pivotal connection at 134 with the free end of a lever 135, which is pivoted to the casing 130 at 136. The slot for the stem of the tumbler or glass in the casing 130 is designated by reference character 137, and 138 is a wearing plate formed preferably as a part of the casing 130 at the bottom and below the slot upon which the base of the glass or tumbler slides in being inserted into the slot 137 for positioning it beneath the faucet or draw-off cock. 140 is a tubular member rotatably mounted or supported in suitable bearings as indicated at 141 in the casing 130. In the lower end of the frusto-conical valve 122 I form a projecting key 142, the same being adapted to co-operate with a key slot 143 in the upper end of the tubular member 140. The slots and the key in the valve member co-operating with the slot in the upper end of the tube 140 provides a flexible connection by which the valve and the tube are interlocked together. Fastened to the upper end of the tube 140 and preferably surrounding the same is a hub portion 144 to which may be integrally connected an actuating arm 145. Around the hub portion 144, which will be fixed in relation to the tube 140 at the upper end thereof, I provide a sleeve with an expanded or cup-like portion 146 to receive any drip from the lower end of the valve, and as a part of this sleeve I also provide a radially extending trough 147 with a cup-like portion 148 on the end thereof normally adapted to be positioned immediately below the nozzle of the faucet whenever the valve is in closed position to receive any drip therefrom and to conduct the same from the cup 148 through the trough 147, the perforation 149 in the hub portion and registering perforation 150 in the tube.

This construction, it will be seen, is such that the operator when the dispensing urn is filled with liquid may by operating the actuating arm 145 cause the tube 140 to rotate on its vertical axis and so rotate the valve 122 of the spigot or cock to a position at right angles to the position of the same as shown in Fig. 4, whereby the perforation 128 therein will register with the discharge outlet in the faucet and permit beverage to pass therethrough. This action will also swing the cup and the drip trough 147 from beneath the spigot and will permit the beverage to pass into the glass or tumbler.

The tubular member 140 extending downwardly through the bearing in the top plate of the casing 130 is journalled near the bottom of the casing and has secured thereto to rotate therewith a notched or segmental plate 151. The slot 137 has provided in connection therewith in the casing 130 a locking device of peculiar form designated generally by reference character 152 and pivotally connected to oscillate in relation to the casing on the pivot pin 153. 154 is a pin eccentric to the pivot pin 153 carried on the heel of the member 152 and adapted to co-operate with certain projections and indentations in the periphery of the segmental plate 151 as it is rotated by the tube 140, which operates the draw-off cock or faucet. The member 152 is provided at its free or peripheral end from the pivot 153 with a curved finger 155 adapted to traverse across the path of a stem of a tumbler or glass as it enters or leaves the slot 137 in the casing. Further details of my improved interlocking and registering device will be described in connection with its mode of operation, which is as follows:

In the normal condition of the apparatus with the valve 122 of the faucet closed, the valve of the faucet will be in the position shown in Fig. 4 and the mechanism of the recording and interlocking device for the glass or tumbler will be in the position of the parts shown in Fig. 7. When the stem of the tumbler or glass is introduced into the slot 137 the disc at the bottom of the stem, which is shown in dotted lines in Fig. 6 and in full lines in Fig. 10, and is designated by reference character 156 will, upon entering the slot, contact with an angular projection 157 on the extremity of an arm 158 pivoted at 159 to the casing and having a radially projecting branch in the form of a pawl 160 (see Fig. 6). As shown in Fig. 6 when the stem with the disc 156 of a tumbler or glass is inserted, the first action of the periphery of the glass base is to engage the projection 157 and oscillate the arm 158 on its pivot against the action of the tension spring 161 to release the pawl 160 from the ledge or projecting portion 162 on the segmental plate 151, thus bringing the lever 158 and the pawl 160 into the position shown in Fig. 6 with the stem and base of the glass all the way into the slot. It will be seen that as long as the pawl 160 is in engagement with the projecting portion 162 on the disc 151 the tubular member 140 and consequently the faucet valve 122 will be locked in closed position as shown for example, in Fig. 4, with the drip pan 148 in position underneath the spigot so that any beverage dropped from the faucet would find its way through the openings into the tubular member 140 and drain thence back into the system or into a vessel for waste as desired.

With the stem of the glass or tumbler in the position shown in Fig. 6, however, the faucet will be released so that the operator by grasping the actuating arm 145 may open the valve. However, the rotation of the segmental disc 151 connected with the faucet and the tubular member 140 in the clock-wise direction to open the valve of the faucet will bring the parts also into the position in which the disc 151 and the oscillating locking member 152 with its arm 155 are to be seen in Fig. 6. In other words, when the disc 151 rotates in the clock-wise direction from the position of Fig. 6 to the position of Fig. 7 the slot 163 in the periphery of the disc which engages the pin 154 on the heel of the locking arm 152 as shown in Fig. 7 will oscillate the arm to the position shown in Fig. 6, causing the locking projection 155 to pass through the registering openings 164 and 165 on the opposite sides of the slot 137 in the casing and thus effectually locking the stem of the tumbler 156 into the slot 137 of the casing 130. This oscillation of the plate 151 will bring the projection 166 against the fixed post 167 affixed to the top plate of the casing as a stop. The oscillation of the locking finger 155 to its tumbler locking position will at the same time cause the cam surface 168 thereon to engage pin 169 on the free end of the pivoted lever 135 and oscillate the same against the action of tension spring 170, which will impart movement to the arm 132 on the shaft of the counting device 131, imparting a portion of a cycle of movement to the counting device to be completed on the withdrawal of the glass or tumbler for the purpose of indicating the dispensing of one unit or tumbler full of the beverage. The return of the lever 135 to the normal position shown in Fig. 7 and the completion of the cycle of counting movement of the recording device 131 will obviously be completed when the tension spring 170 is permitted to return the lever 135 to the position shown in Fig. 7 upon the retraction of the locking finger 155, permitting the withdrawal of the glass or tumbler and the service of the beverage withdrawn and contained therein.

Thus, from the described construction and operation of the dispensing and recording mechanism, it will be seen that the draw-off valve 122 will be normally in the closed position as shown in Fig. 4 with the position of the tubular member 140 and parts carried thereby in such position that any drip will be collected in the pan 148 and drained therefrom through the tube 140, and that when the attendant desires to dispense from either of the cocks or faucets a tumbler full or portion of beverage to a customer, finding the position of the dispensing apparatus described in the positions of the parts shown in Figs. 4 and 7, for example, he will find the actuating arm 145 of the draw-off cock or faucet locked against further withdrawal of beverage until he frees the cam disc 151 to unlock the mechanism, which will be done by inserting the stem and passing the tumbler into the slotted portions of the casing 130 to the position of the parts shown in Fig. 6, which will result in the disc on the base of the tumbler operating the pawl 160 to free the disc and the draw-off faucet lever, which will permit him to operate the lever or actuating arm 145 as soon as the device is unlocked and to start the flow of the beverage through the perforation 128 in the faucet valve 122, the turning of the valve through approximately ninety degrees of movement operating also to withdraw the arm 147 and cup 148 to permit the beverage to flow into the tumbler placed directly beneath the spout 121 of either faucet, as desired.

Obviously, nothing will be required to compel the attendant to fill the glass or tumbler, since that will be checked by the customer and when the glass is full it can not be withdrawn without closing the valve of the faucet to the normal closed position shown in Fig. 4, whereupon he may withdraw the glass due to the synchronous withdrawal of the locking finger 155 from the slot accommodating the stem of the tumbler. This completion of the cycle of movement of inserting and filling the tumbler and withdrawing the same will result in completing the cycle of movement to record the operation, indicating one additional dispensing unit added to the total on the recording device 131, and from which it will be seen that any insertion of the dispensing tumbler followed by opening and closing the valve will result in recording the same and that the draw-off faucets or cocks will be locked at all times against opening without the insertion of the tumbler thereby insuring proper insertion and recording of each individual service, thus furnishing a positive check upon the work and report of the attendant in serving from each faucet of the dispensing device.

Another important feature of my invention consists in certain improved details of construction in my system for conveying beverages to be dispensed from the storage and mixing tanks 12 and 13 to and through the dispensing urn. Since one of the important uses to which my system is adapted for successful use is in dispensing fruit beverages such as the juice of oranges and the like, it is of the utmost importance that all portions of the connecting pipe lines and conveying ducts from the receptacles 12 and 13 to the nipples 121 of the faucets or draw-off cocks be readily accessible for thorough cleaning and scrubbing thereof in order to insure perfect sanitation and avoid the collection of portions of the beverage either in the liquid or solid form in any parts or pockets in the system. Where beverage is made from oranges and the like some portions of the pulp and other more or less solid materials will be found in the prepared beverage, and I not only take precautions to use, in the construction of the storage tanks 12 and 13 and the beverage conduit system leading therefrom to the dispensing apparatus, metals as free as possible from corrosion, due to any acids or other deleterious substances that may be found in beverages being dispensed, but I have devised special fittings throughout the conduit system for the beverage to enable quick and easy accessibility to all portions thereof for the insertion of cleaning devices like brushes and the like, the details of which will now be described.

In order to avoid the use in the beverage conduit system of any inaccessible angle fittings, I provide at all turns in the conduit system, which are shown as preferably, although not necessarily right angle turns, special fittings in the nature of double T fittings indicated generally by the reference character 180 shown in detail in the sectional view Fig. 16, and in the assembled view of the system in Fig. 1. This fitting 180 is in effect a four-way fitting consisting of a casing provided with four externally threaded nipples 181 spaced ninety degrees apart to provide connections for intersecting pipes. Where right angle connections only are desired two of these nipples only may be utilized and the others closed by suitable internally threaded cap devices 182 shown in detail in Figs. 16 and 18. Obviously, when a T connection or a connection for the ends of the three pipes is desired, as at the top of the vertical pipe 35, in the beverage conduit system, only one of such caps will be required. It will be seen that these caps 182 in the system, as I have arranged it in Fig. 1, will provide ready means for access to every part of the pipe conduit system so that the conduit throughout may be cleansed by the insertion of a brush on a wire or rod into the interior of the pipe, thus insuring perfect sanitation in the beverage conduit system. As a further precaution against insanitary and non-accessible joints, I provide an improved form of pipe and fitting connection, as shown in detail in Fig. 16, for connecting all portions of the beverage conduit system such as the pipes 29, 30, 33, 34, 35, 36 and 37, whereby any portion of the conduit may be easily removed from the system for cleansing and reattached to insure a liquid-tight and sanitary joint comparatively free from any pockets or corners inaccessible to cleaning and likely to serve as a place of lodgment for portions of beverage of unstable character that might result in unsanitary conditions in the system. This joint consists of a cylindrical pipe in the nature of the pipe or tube 190 shown in Fig. 16, which is so indicated for illustrative purposes only and may apply with equal force to the details of either of the aforesaid pipes used in the beverage system from 29 to 37 inclusive. These pipes in the beverage system are all plain cylindrical pipes without any threaded ends except that at each end thereof I prefer to ream them out with a conical tool on the inside diameter at the ends so that they will have a comparatively knife-like edge on their outer periphery at the ends as designated by reference character 191 in the part of the pipe 190 in the fitting shown in Fig. 16. This dispenses with any pockets or angular corners that may be formed between the casing of the fittings and the ends of the pipes at their juncture, and I prefer to bore the interiors of the fitting casings 180 so that they shall be perfectly smooth in their interiors and of substantially the same diameter as the external diameter of the ends of the pipe 190, the fitting being such that the pipes when loosed from their connectors may be readily detached from the fittings. In order to clamp the pipes and fittings together into a liquid-tight relation I have provided a special clamping glandular nut shown in Figs. 16 and 17 and designated generally by reference character 192. This is in the form of a cup or internally threaded nut adapted to co-operate with the threaded nipples 181 of the fitting and provided with a peripheral opening or gland designated at 193 for taking suitable flexible packing material, if desired, as a further precaution against leakage at the joint, such packing, of course, to be only on the exterior of the pipe.

This glandular nut 192 has an opening or perforation in the bottom thereof opposite the internally threaded end of a size approximately registering with the external diameter of the pipe, and when it is screwed into position on the nipple of the fitting, it may be clamped around the pipe in a locked and substantially liquid-tight relation thereto by reason of the radial slots 194 which separate the two pairs of perforated ears 195 extending radially on opposite sides of the pipe opening. The perforations in these in at least one of each pair are threaded to take the clamping screws 196 by which this split portion of the glandular clamping nut 192 may be effectually clamped in position on the pipe and the same securely locked in relation to the fitting.

This form of pipe connection is adaptable not only to the angular fittings but to the nipples of the casing of the beverage cocks 31 and 32 controlling the beverage lines as shown in Fig. 1. The details of these beverage cocks 31 and 32 are shown in Figs. 14 and 15, the reference character 200 being used to designate specifically the casing which will be provided with a special form of conical perforated rotary valve 201 formed like the fitting casing of non-corrosive metal and with an operating handle 202, being held in position in its conical seat by the washer 203 on the stem at the lower end of the valve and retained in liquid-tight position by means of a compression spring 204 and adjusting nut 205. The pin 206 serving in conjunction with ledges 207, 208 formed on the casing 200 as stops to limit the movement of the valve in either of its opened or closed positions of adjustment.

In Figs. 11, 12 and 13 I have shown the details of a form of sylphon valve control for use in temperature regulating system as shown in Fig. 1, this being designated generally in Fig. 1 by the reference character 89 and inserted in the return pipe system between the dispensing urn and the expansion tank 86. The casing 89, as shown in detail in the sectional view Fig. 11, is preferably provided of two parts or chambers 210, 211, the former being provided with a threaded nipple 212 for receiving the return pipe 48 conducting the temperature regulating fluid from the dispensing urn. Likewise, the chamber 211 is provided with a threaded nipple 213 for receiving the threaded end of the pipe 90 leading directly to the expansion tank. 214 designates a flexible metallic chamber of the common sylphon type made of copper or other suitable flexible material, being clamped at one end as indicated at 215 to the end walls of the casing 210 and supporting at its opposite extremity one end of a stem 216 of a valve 217. The end of the compartment 210 at the free end of the sylphon device is closed by a partition that may be threaded or otherwise secured to the compartment 210, and the compartments 210, 211 are assembled as shown in Fig. 11, this partition serving as an inner wall for dividing the two compartments and being perforated permits the passage therethrough of the stem 216 of the valve and permitting the valve 217 to seat on the surface of the partition on the inside of the compartment 211. This partition is designated by reference character 218 and it is shown in detail in Fig. 13, the central perforation for the valve stem 216 being designated by reference character 219. The latter is surrounded by a plurality of spaced perforations 220, all of which are adapted to be closed by the seating of the valve 217 upon this partition in the manner illustrated in Fig. 11. The free end of the valve stem 216 is passed into a glandular chamber 221 formed in the outer wall of the casing 211, and the outer end of the valve stem is engaged by a compression spring 222, adjustable by means of a threaded support 223 having a portion accessible for operating it on the exterior of the gland and being adapted to be locked into position by a locking nut threaded to the externally threaded periphery thereof, designated by reference character 224. A peripheral glandular compartment 225 is provided between the locking member 224 and the casing for the use of a flexible gasket to insure a liquid-tight connection. 226 and 227 are screws used in locking the compartments of the casing 89 together. The sylphon valve 214 is of the type commonly adapted to be affected by changes in temperature and upon the expansion thereof it will lift the valve 217 from its seat against the action of the spring 222 and permit the passage of the temperature regulating fluid on its return from the dispensing device through the nipple 212 and the perforations 220 in the partition adjacent the valve seat and through the nipple 213 into the expansion tank. The reference character 228 designates a normally open port in the partition permitting the passage of a minimum amount of cooling fluid at all times regardless of the temperature thereof.

From the previous description of the temperature regulating system, it will be noted that from the pump 88 which circulates the temperature regulating fluid there are two pipe systems employed, the one first described leading to the storage units 10 and 11 and the other, the pipe system last described, leading from the pump to the dispensing unit or urn 40 with the return line back to the expansion tank 86 controlled by the temperature control sylphon valve just described. In Fig. 1 I have shown the preferred arrangement of the apparatus, from which it will be seen that chiefly in the supply and return pipe lines 97 and 106 and the by-pass extensions 108 and 110, I maintain a hydro-static column of liquid free at all times to be circulated by the pump 88, which is normally intended to be operated continuously while beverage is contained in the storage tanks or in other parts of the system. The effect of this column of liquid is obviously to result in an amount of pressure being exerted upon the refrigerating pipe system leading to, through and from the dispensing unit or urn. It will furthermore be seen that the movement of the temperature regulating fluid through this pipe circuit and through the urn will be determined by the sylphon valve which will open and close under the control of the temperature of the liquid in the system.

I have heretofore referred specifically to the sanitary construction of the storage tanks and the beverage pipe system by which all parts thereof are constructed to permit easy access for cleaning. This is particularly true of the most complicated parts of the beverage dispensing apparatus, namely the urn, the details of which have been described and from which it will be seen that all parts of the urn itself are easily accessible because of the ready manner in which the construction of the various portions lend themselves to ease in disassembling. For example, in cleaning the dispensing urn and the beverage conduits immediately associated therewith, I provide in the refrigerating pipe lines between the pump 88 and the urn and expansion tank special means to assist in cutting off the circulation of the temperature regulating fluid to the urn when desired in cleaning. This comprises the valve 240 in the pipe line 96 and a return pipe for the refrigerant to the expansion tank as indicated by reference character 241 under the control of valve 242. Therefore, when it is desired to clean the dispensing urn the valve 240, which is normally open, will be closed so that the pump 88 will be free only to circulate temperature regulating fluid through the system leading to and around the storage tanks, which will be returned through the return line 106. This will permit the temperature regulating lines leading to the dispensing tank or urn to be drained by opening the valve 242 and enable the urn to be disassembled for cleaning after the beverage is drained from the urn through the draw-off cocks, and any residue taken out by removing the caps at the clean-out connection 180 in the beverage line below the urn. If beverage remains in the storage tanks after the closing of valves 31 and 32 the beverage line between the valves 31 and 32 and the urn may be cleaned by removing the caps from the connections 180 and the dispensing urn will then be in condition for disassembling and cleaning.

This will be accomplished by first removing the hand clamping nuts 71 from the threaded rod 70 which will permit the top plate 64 to be removed from the urn. When this is done the cylinder 61 may be likewise removed and cleaned. This will leave the base plate of the urn 43 and its supporting legs, the upper surface of which including the temperature regulating unit 79, partially exposed for cleaning with brushes and the like. This may be further accomplished by removing the detachable band 116, affording access to the sump 48 in the top of the plate 43. Brushes also may be inserted through the open ended beverage tubes 82 and to further clean the beverage conduits in and below the bottom plate 43 this plate and its supporting legs may be removed from the bottom plate 42 on the support by disconnecting the threaded hand unions 251 in each of the beverage and refrigerating lines 37, 47 and 48, respectively.

In order to insure perfect sanitation, it is very imperative that all portions of the dispensing urn and the conduit and storage systems be thoroughly cleansed or cleaned at regular intervals, and particularly, is this necessary where fruit juices and milk beverages are dispensed, in which cases ordinary daily cleaning is required.

Having fully described my improved dispensing apparatus, I desire to point out that persons skilled in the art may resort to various modifications while at the same time utilizing the principles of my invention, and it is not desired to be limited to the details thereof except as set forth in the claims.

I claim:

1. A beverage dispensing apparatus comprising a beverage storage tank, a dispensing urn positioned below the level of the storage tank provided with a hand operated draw-off cock, a pipe connection leading from the said beverage storage tank to the dispensing urn whereby beverage will flow from the storage tank to the said urn, and means within the said storage tank for agitating fluid beverage therein.

2. A beverage dispensing apparatus comprising a beverage storage tank, a dispensing urn positioned below the level of the storage tank provided with a hand operated draw-off cock, a pipe connection leading from the said beverage storage tank to the dispensing urn whereby beverage will flow from the storage tank to the said urn, and means within the said storage tank for agitating fluid beverage therein comprising a motor operated stirring device detachably connected with the said storage tank.

3. A beverage dispensing apparatus comprising a beverage storage tank, a dispensing urn provided with a hand operated draw-off cock, a pipe connection leading from the said beverage storage tank to the draw-off urn, and means within the said storage tank for agitating fluid beverage therein comprising a detachable cover for said storage tank, a vertical shaft rotatable upon said detachable cover and supported thereby with the free end thereof projecting into the interior of said storage tank and being provided with agitating blades, means carried by the said cover for imparting rotary movement to the said vertical shaft, and means for mechanical and automatic intermittent control of the operation of said agitating means.

4. A beverage dispensing apparatus comprising a storage tank for fluid beverage, a dispensing urn, a valve controlled conduit for withdrawing fluid beverage from the said storage tank to the dispensing urn, and an intermittently operated automatically controlled and mechanically operated agitating device having the agitating portions thereof within the storage tank for stirring fluid beverages therein.

5. In a beverage dispensing apparatus, the combination with a fluid beverage storage tank, a dispensing urn provided with a hand operated draw-off cock, a valve controlled pipe through which fluid beverage flows by gravity from said storage tank to said draw-off urn, and means for automatically controlling the degree of temperature of the beverage as it passes through the dispensing urn.

6. A beverage dispensing apparatus, comprising in combination a beverage storage tank, a beverage dispensing urn provided with a hand operated draw-off cock, a stirring device within the beverage tank, and means for operating the said stirring device at predetermined intervals comprising an electric motor and a time controlled switching device for automatically starting and stopping the operation of said motor.

7. In a beverage dispensing apparatus, the combination with a beverage storage tank, of means for agitating fluid beverage material within said tank, a beverage dispensing urn provided with a hand operated draw-off cock, a pipe system for conveying fluid beverage material from said beverage storage tank to said dispensing urn, a circulatory pipe system for supplying a heat regulating fluid adjacent the said beverage storage tank and said dispensing urn for controlling the temperature of fluid beverage materials therein, and means for circulating a fluid temperature controlling medium in said circulatory system.

8. In a beverage dispensing apparatus, the combination with a beverage storage tank, means for controlling the temperature of fluid beverage material within said tank, a beverage dispensing urn provided with a hand operated draw-off cock, a pipe system for conveying fluid beverage material by gravity from said beverage storage tank to said dispensing urn, a circulatory pipe system for supplying a heat regulating fluid adjacent the said beverage storage tank and said dispensing urn, means for automatically controlling the temperature of fluid beverage materials as they pass through said urn, and means for circulating a fluid temperature controlling medium in said circulatory system.

9. In a beverage dispensing apparatus, the combination with a beverage storage tank and a beverage dispensing urn, of a pipe connection between said storage tank and said dispensing urn for delivering fluid beverage material by gravity from the said tank to said urn, a circulatory system for supplying a fluid temperature regulating medium adjacent both said storage tank and said dispensing urn, a pump for circulating the said temperature controlling medium in said circulatory system, and a temperature operated device for automatically controlling the circulation of said temperature regulating medium in relation to said dispensing urn.

10. In a beverage dispensing apparatus, the combination with a beverage dispensing urn, of a pipe conduit system for delivering by gravity fluid beverage materials to said dispensing urn, a circulatory system for passing a fluid temperature regulating medium adjacent said dispensing urn for controlling the temperature of beverage material contained therein, a pump for circulating temperature controlling fluid in said system, and a temperature operated valve for automatically controlling the circulation of the said temperature controlling fluid in relation to the dispensing urn.

11. The combination with a beverage storage tank of a beverage dispensing urn provided with a hand operated draw-off cock, a pipe line providing a beverage conduit between said storage tank and said dispensing urn, a circulatory system for circulating a fluid temperature controlling medium to said storage tank and said dispensing urn, a pump connected with said circulatory system, a hand operated cut-off valve interposed in the conduit for the temperature regulating medium between the storage tank and the said pump, and a safety device for protecting the pump and the conduit system connected therewith against the development of excessive pressures within the system in the event of the improper operation of the hand operated cut-off valve, the said device comprising a by-pass between the pipe line of the circulatory system leading from the pump to the storage tank and the return line of the same system leading from the storage tank.

12. The combination with a beverage storage tank of a beverage dispensing urn provided with a hand operated draw-off cock, a pipe line providing a beverage conduit between said storage tank and said dispensing urn, a circulatory system for circulating a fluid temperature controlling medium to said storage tank and said dispensing urn, a pump connected with said circulatory system, a hand operated cut-off valve interposed in the conduit for the temperature regulating medium between the storage tank and the said pump, and a safety device for protecting the pump and the conduit system connected therewith against the development of excessive pressures within the system in the event of the improper operation of the hand operated cut-off valve, the said device comprising a by-pass having a portion thereof elevated to a point at least as high as the circulatory system for controlling the temperature of the beverage materials within the storage tank.

13. A beverage dispensing apparatus, comprising a beverage storage tank, a dispensing urn provided with a hand operated draw-off cock, a pipe connection leading from said beverage storage tank to the draw-off urn, and means in the pipe connection leading from said beverage storage tank to the draw-off urn to permit accessibility for cleaning purposes to every portion of said pipe connection.

14. A beverage dispensing apparatus, comprising a beverage storage tank, a dispensing urn provided with a hand operated draw-off cock, a pipe connection leading from said beverage storage tank to the draw-off urn, and means in the pipe connection leading from said beverage storage tank to the draw-off urn to permit accessibility for cleaning purposes to every portion of said pipe connection, said means comprising openings in the pipe connection at all angular turns in said pipe connection, and detachable means for normally closing said openings.

15. A beverage dispensing apparatus, comprising a beverage storage tank, a dispensing urn provided with a hand operated draw-off cock, a pipe connection leading from said beverage storage tank to the draw-off urn, and means in the pipe connection leading from said beverage storage tank to the draw-off urn to permit accessibility for cleaning purposes to every portion of said pipe connection, said means comprising openings in the pipe connection at all angular turns in said pipe connection, and detachable means for closing said openings comprising screw threaded caps adapted to co-operate with externally threaded nipples surrounding said openings in the pipe connection.

16. A beverage dispensing device, comprising a beverage conduit, a draw-off spout forming a continuation of said beverage conduit, a hand operated cock for controlling the passage of beverage through said spout, means for controlling the temperature of beverage passing through said conduit to said spout comprising a pipe adapted to permit the circulation of a temperature regulating fluid adjacent a portion of said beverage conduit and a controlling device adapted to be actuated by the temperature regulating fluid after the fluid passes from contact with the beverage conduit.

17. A beverage dispensing apparatus, comprising a beverage conduit having inserted therein an enlarged receptacle for containing a quantity of beverage greater than the normal amount contained in a given cross sectional area of said conduit, a draw-off spout connected therewith, a hand operated cock for controlling said spout, and means for controlling the temperature of beverage passing through the enlarged portion or receptacle of said beverage conduit comprising a fluid pipe system having a portion thereof passing within the enlarged portion or receptacle of the conduit to be engaged by beverage passing through the said conduit when activated by being drawn through the said draw-off spout.

18. A beverage dispensing apparatus, comprising a receptacle for fluid beverage, a draw-off spout in communication therewith, a valve for controlling said spout provided with hand operated means for opening and closing the valve, means for normally locking the hand operated means so that the valve is locked in closed position, and means adapted to be operated by the insertion of a receiving receptacle beneath the spout for releasing the hand operated means to permit the opening of said valve.

19. In a beverage dispensing apparatus, the combination with a conduit for delivering fluid beverage when the spout is open, a valve for controlling said spout, hand operated means for operating the valve to its open and closed positions, locking means operatively connected with the valve for normally locking the valve in closed position, and means interposed in the path of a portable receptacle for receiving a dispensing portion of beverage from the spout and adapted to be necessarily actuated by the insertion of the receptacle into beverage receiving position beneath the spout to unlock the said locking means whereby to release the valve and permit its operation by its said hand operated means.

20. The combination in a beverage dispensing device, of a valve adapted to control beverage discharged therefrom, hand operated means for operating said valve to its open and closed position, means for locking the hand operated means so that the valve is normally locked in its closed position, and means positioned adjacent said valve and adapted to be actuated by the insertion of a receiving receptacle beneath said valve whereby to release said locking means to permit the actuation of the said valve to its open position.

21. In a beverage dispensing device, the combination with a draw-off valve of hand operated means for operating said valve to its open and closed positions, means for locking said valve in its closed position, means adapted to be actuated by the insertion of a portable detachable receptacle into its receiving position beneath the valve for operating the valve locking means to its position to release the valve, means adapted to be actuated by the opening of the valve for locking the receptacle in its receiving position, and means adapted to be actuated by the hand operated means in closing the valve for releasing the receptacle locking means.

22. In a beverage dispensing device, the combination with a valve, of hand operated means for opening and closing the valve, means for normally locking the valve in its closed position, means adapted to be actuated by the insertion of a detachable portable receptacle into beverage receiving position beneath the valve for releasing the valve locking means, and means for locking the receptacle in its beverage receiving position while the valve is in open position, said means being adapted to release the receptacle locking means upon the actuation of the valve to its normal closed and locked position.

23. The combination in a beverage dispensing device, of a valve, hand operated means for actuating said valve, means for locking the valve actuating means in its normal closed position, means adapted to be actuated by the insertion of a detachable portable receptacle into beverage receiving position beneath the valve for unlocking the valve, means operated by the valve actuating means for locking the receptacle in its beverage receiving position, means adapted to be actuated by the operation of the valve operating means to closed position for releasing the receptacle locking means, and means actuated by the valve controlling means for recording the successive cycle operations of movement of the valve permitting the withdrawals of individual portions of beverage upon each application of the receptacle to its receiving position adjacent the valve.

24. In a beverage dispensing device, the combination with a draw-off spout, a valve controlling said draw-off spout, hand operated means for operating the valve, means for locking the valve operating means in its normal closed position, means adapted to be actuated to its operative position by the insertion of a portable detachable receptacle into normal position for receiving beverage from the draw-off spout for unlocking the valve, means operated by the actuating means for locking the receptacle in its receiving position beneath the spout, means actuated by the hand operated valve controlling means for releasing the receptacle locking means, and means operatively connected with the valve operating means and with the receptacle locking means for recording the successive insertions of the receptacle into its beverage receiving position and the corresponding valve movements.

25. In a beverage dispensing device, the combination with a draw-off spout, of a valve for controlling said spout, a handle operatively connected with the valve, an arm operatively connected with the handle, a receptacle positioned on said arm and adapted to swing beneath the outlet of the spout when the valve is in its closed position to receive the drippings from the spout, there being a duct in said arm communicating with said receptacle for dispensing of drippings from the receptacle, said arm and drip receptacle being adapted to swing from position beneath the spout when the handle is operated to actuate the valve to its open position.

26. In a beverage dispensing device, the combination with a draw-off spout, of a valve for controlling said spout, a handle operatively connected with the valve, an arm operatively connected with the handle, a receptacle positioned on said arm and adapted to swing beneath the outlet of the spout when the valve is in its closed position to receive the drippings from the spout, there being a conduit provided in said arm to convey said drippings from the receptacle, said arm and drip receptacle being adapted to swing from position beneath the spout when the handle is operated to actuate the valve to its open position to obviate interference in the use of the beverage dispensing receptacle beneath the spout.

27. The combination in a beverage dispensing device, of a draw-off spout, a valve for controlling said spout, a handle adapted to be operated on a vertical axis for controlling said valve, and a drip cup extending radially from the pivotal axis of said handle and adapted to be positioned normally under the delivery end of the draw-off spout to receive drippings therefrom when the valve is operated to the closed position, there being provided a conduit having an outlet through the pivotal axis of the handle for conveying the drippings from the cup.

28. In a beverage dispensing device, the combination with a draw-off spout, a hand operated valve for controlling said spout, means for normally locking said valve controlling means and the valve in its closed position, means operable upon the insertion of a beverage dispensing receptacle into receiving position beneath the spout for unlocking the valve controlling means, means operable by the movement of the valve controlling means to open position for locking the receptacle in said receiving position, and means operable by the valve controlling means upon the actuation of the valve to its closed position for releasing the receptacle locking means.

29. In a beverage dispensing device, the combination with a draw-off spout, a valve for controlling said spout, hand operated means for operating the valve to its open and closed positions, means for normally locking the valve in its closed position, means adapted to be actuated upon the insertion of a portable detachable receptacle to its beverage receiving position for unlocking the valve locking means, and for locking the receptacle in its beverage receiving position adjacent the spout, means actuated by the movement of the valve to its closed position to automatically register each individual insertion of the receptacle into beverage receiving position adjacent the spout, and also means actuated by the closing of the valve to release the receptacle locking means.

30. In a beverage dispensing device, the combination with a dispensing urn provided with a draw-off cock, temperature controlling means for beverage within the urn comprising a circulatory pipe system connected with a source of temperature regulating fluid, a temperature control device for automatically controlling the circulation of temperature regulating fluid in the urn, the said temperature controlling means being adjustable over a varied range of temperatures and being located in the pipe system whereby it will be operated by contact with the temperature regulating fluid immediately following its discharge from the dispensing urn, and means for circulating the temperature regulating fluid through the said system.

31. In a beverage dispensing system, the combination with a beverage storage tank and a dispensing urn provided with a hand operated draw-off cock, of a pipe system for conveying beverage from said storage tank to said urn, comprising a plurality of pipe sections connected in series, all of said pipe sections being circular in cross section with smooth interiors, said pipe sections being connected with fittings provided with removable clean-out caps whereby upon the removal of said caps a straight-way is opened for readily cleaning the interiors of the pipes by the insertion of suitable cleansing means.

32. A beverage dispensing apparatus, comprising a dispensing urn provided with a hand operated draw-off cock, and a pipe connection for supplying beverage thereto, said dispensing urn consisting of a hollow container the open ends thereof being closed by a bottom supporting base plate and a top cover plate, a temperature regulating device comprising a fluid circulatory system for circulating a temperature regulating fluid on the interior of said hollow container and in contact with beverage in said container, and quick detachable means for detachably connecting said hollow container to said top and bottom plates and for connecting said container with said pipe connection whereby to provide quick and easy access to all interior surfaces of said urn in contact with beverage being dispensed therefrom for sanitary purpose.

In testimony whereof I have signed my name to this specification, on this 6th day of February, A. D. 1928.

HENRY W. TUTTLE.